(12) United States Patent
Kaluskar et al.

(10) Patent No.: US 7,415,522 B2
(45) Date of Patent: Aug. 19, 2008

(54) EXTENSIBLE FRAMEWORK FOR TRANSFERRING SESSION STATE

(75) Inventors: Sanjay Kaluskar, Menlo Park, CA (US); Sreenivas Gollapudi, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 837 days.

(21) Appl. No.: 10/917,843

(22) Filed: Aug. 12, 2004

(65) Prior Publication Data

US 2005/0038849 A1   Feb. 17, 2005

Related U.S. Application Data

(60) Provisional application No. 60/495,368, filed on Aug. 14, 2003.

(51) Int. Cl.
*G06F 15/16* (2006.01)
*G06F 12/00* (2006.01)

(52) U.S. Cl. .................................. 709/227; 709/238
(58) Field of Classification Search ......... 709/227–230, 709/232, 238–244
See application file for complete search history.

(56) References Cited

U.S. PATENT DOCUMENTS

| | | | |
|---|---|---|---|
| 5,758,345 A | 5/1998 | Wang | |
| 5,774,668 A | 6/1998 | Choquier et al. | |
| 5,890,167 A | 3/1999 | Bridge, Jr. et al. | |
| 5,918,059 A | 6/1999 | Tavallaei et al. | |
| 5,951,694 A | 9/1999 | Choquier et al. | |
| 6,041,357 A | 3/2000 | Kunzelman et al. | |
| 6,088,728 A | 7/2000 | Bellemore et al. | |
| 6,178,529 B1 | 1/2001 | Short et al. | |
| 6,243,751 B1 | 6/2001 | Chatterjee et al. | |
| 6,272,503 B1 | 8/2001 | Bridge, Jr. et al. | |
| 6,327,622 B1 | 12/2001 | Jindal et al. | |
| 6,587,866 B1 | 7/2003 | Modi et al. | |
| 6,601,101 B1 * | 7/2003 | Lee et al. | 709/227 |
| 6,667,751 B1 | 12/2003 | Wynn et al. | |

(Continued)

FOREIGN PATENT DOCUMENTS

EP   0 942 363 A2   9/1999

(Continued)

OTHER PUBLICATIONS

International Preliminary Examining Authority, "Written Opinion of the International Preliminary Examining Authority," Jun. 7, 2005, 4 pages.

(Continued)

*Primary Examiner*—Zarni Maung
(74) *Attorney, Agent, or Firm*—Hickman Palermo Truong & Becker LLP

(57) ABSTRACT

Techniques allow a client to be switched from a session on a server to another session on another server in a way that is transparent to the application for which the initial session was established. Thus, under transparent session migration, a client is switched between sessions without executing application instructions tailored to accomplish the migration. Instead, a client-side interface component, through which the application interacts with the server, handles details of migration, modifying the internal state of the client-side interface component to effect the same. Legacy applications do not have to be modified in order to institute techniques described herein.

18 Claims, 9 Drawing Sheets

U.S. PATENT DOCUMENTS

| | | | |
|---|---|---|---|
| 6,728,748 | B1 | 4/2004 | Mangipudi et al. |
| 6,816,907 | B1 | 11/2004 | Mei et al. |
| 7,058,957 | B1 | 6/2006 | Nguyen |
| 7,107,294 | B2 | 9/2006 | Romanufa et al. |
| 7,174,379 | B2 | 2/2007 | Agarwal et al. |
| 7,178,050 | B2 | 2/2007 | Fung et al. |
| 7,263,590 | B1 | 8/2007 | Todd et al. |
| 7,269,157 | B2 | 9/2007 | Klinker et al. |
| 2002/0073139 | A1 | 6/2002 | Hawkins et al. |
| 2002/0161896 | A1 | 10/2002 | Wen et al. |
| 2002/0194015 | A1 | 12/2002 | Gordon et al. |
| 2003/0007497 | A1* | 1/2003 | March et al. ................ 370/410 |
| 2003/0088671 | A1 | 5/2003 | Klinker et al. |
| 2003/0108052 | A1* | 6/2003 | Inoue et al. ................ 370/399 |
| 2003/0135642 | A1 | 7/2003 | Benedetto et al. |
| 2003/0217159 | A1 | 11/2003 | Schramm-Apple et al. |
| 2004/0111506 | A1 | 6/2004 | Kundu et al. |
| 2004/0117794 | A1 | 6/2004 | Kundu |
| 2004/0176996 | A1 | 9/2004 | Powers et al. |
| 2004/0268357 | A1 | 12/2004 | Joy et al. |
| 2005/0021771 | A1 | 1/2005 | Kaehn et al. |
| 2005/0239476 | A1* | 10/2005 | Betrabet et al. .......... 455/456.1 |
| 2005/0267965 | A1 | 12/2005 | Heller |
| 2006/0036617 | A1* | 2/2006 | Bastawala et al. ........... 707/100 |
| 2007/0226323 | A1 | 9/2007 | Halpern |

FOREIGN PATENT DOCUMENTS

| | | |
|---|---|---|
| EP | 0 992 909 A2 | 4/2000 |
| EP | 1 170 662 A2 | 1/2002 |
| WO | WO 02/05116 A2 | 1/2002 |
| WO | WO 02/097676 A2 | 12/2002 |
| WO | WO 03/014928 A2 | 2/2003 |
| WO | WO 03/062983 A2 | 7/2003 |

OTHER PUBLICATIONS

Currents Claims of International Application No. PCT/US04/26570, 4 pages.

International Searching Authority, "Notification of Transmittal of the International Search Report and the Written Opinion of the International Searching Authority, or the Declaration," Aug. 4, 2005, 13 pages.

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report in Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5.

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

International Searching Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

* cited by examiner

EXTENSIBLE FRAMEWORK FOR TRANSFERRING SESSION STATE

FIELD OF THE INVENTION

The present invention relates to capturing and restoring sessions state to perform such tasks as transferring sessions between servers to balance work load in a multi-node computer system.

The present application claims priority to U.S. Provisional Application No. 60/495,368, Computer Resource Provisioning, filed on Aug. 14, 2003, which is incorporated herein by reference.

The present application is related to the following U.S. applications:

U.S. application Ser. No. 10/917,873, Hierarchical Management the Dynamic Allocation of Resources in a Multi-Node System, filed by Benny Souder, et al. on the equal day herewith, and incorporated herein by reference;

U.S. application Ser. No. 10/918,055, Incremental Run-Time Session Balancing in a Multi-Node System filed by Lakshminarayanan Chidambaran, et al. on the equal day herewith and incorporated herein by reference;

U.S. Provisional Application No. 60/601,346, entitled Suspending A Result Set And Continuing From A Suspended Result Set For Transparent Session Migration, filed on the equal day herewith and incorporated herein by reference;

U.S. Provisional Application No. 60/601,250, entitled Suspending A Result Set And Continuing From A Suspended Result Set, filed on the equal day herewith and incorporated herein by reference; and U.S. Provisional Application No. 60/601,259, entitled Suspending A Result Set And Continuing From A Suspended Result Set For Scrollable Cursors, filed on the equal day herewith and incorporated herein by reference.

BACKGROUND OF THE INVENTION

Many enterprise data processing systems rely on multi-node database servers to store and manage data. Such enterprise data processing systems typically follow a multi-tier model that has a multi-node database server in the first tier, and one or more computers in the middle tier and outer tiers.

FIG. 1 depicts multi-node database server mds11, which is implemented on multi-tier architecture 10. A server, such as multi-node database server mds11, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes in a multi-node computer system can be allocated to run a particular server's software. A particular combination of the software on a node and the allocation of the resources from the node is a server that is referred to herein as a server instance or instance. Thus, a multi-node server comprises multiple server instances that can run on multiple nodes. Several instances of a multi-node server can even run on the same node.

A database server governs and facilitates access to a particular database, processing requests by clients to access the database. A multi-node database server, such as multi-node database server mds11, comprises multiple "database instances", each database instance running on a node. Multi-node database server mds11 governs access to database db11. A multi-node database server can govern and facilitate access to one or more databases.

The middle-tier of multi-tier architecture 10 includes middle-tier computer cmp11 and the outer-tier includes user computer cmp12. User computer cmp12 executes browser br11, which interacts with an end-user. The end-user's interaction with browser br11 causes the browser to transmit requests over a network, such as the Internet, to middle-tier computer cmp11. The request causes a process on middle-tier computer cmp11, client c11, to execute application appl11. Execution of application appl11 by the client c11 causes client c11 to connect to multi-node database server mds11. For example, application appl11 may be an order entry application that is configured to receive order requests from browser br11. Data for the order entry application is stored in db11. To process the requests, execution of application appl11 by client c11 causes client c11 to connect to database db11. Once connected, client c11 issues database statements to retrieve and manipulate data stored in database db11.

The tier that directly connects to a server, relative to other tiers in a multi-tier architecture, is referred to herein as containing the client of the server. Thus, client process c11 is referred to herein as the client of multi-node database server mds11.

An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

An application, such application appl11, interacts with a multi-node database server mds11 via client-side interface component intcomp11. Execution of application appl11 causes client c11 to execute client-side interface component intcomp11 to interact with multi-node database server mds11. Application appl11 includes invocations of routines (e.g. functions, procedures, object methods, remote procedures) of client-side interface component intcomp11. Applications are typically developed by vendors and development teams different from those that develop servers and interfaces to servers, such as multi-node database server mds11 and client-side component intcomp11.

In order for a client to interact with multi-node database server mds11, a session is established for the client on a database instance of multi-node database server mds11. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session. A database component is a set of software modules that provide specialized and related functions for a database server, and shall be described later in greater detail. An example of a database component is a Java execution engine.

The beginning and end of a session demarcates a unit of work. Often, the beginning of a database session corresponds to an end-user establishing an interactive session with an application via, for example, a browser, and ends when the end-user logs off. Thus, the beginning and ending of the database session depend on application logic and end-user action, and may not be controlled by a server on which the session is established.

Client-side Interface Components

Client-side interface components, such as client-side interface component intcomp11, are software components that reside and are executed on the same computer of a client of a server, and that are configured to provide an interface between the client and the server. The client-side interface component intcomp11 is configured for performing the detailed operations needed to interface with multi-node database server mds11. For example, an application appl11 invokes a function of client-side interface component intcomp11 to establish a connection to multi-node database server mds11. The client-side interface component then handles the details of a connection on a particular instance of multi-node database server mds11. To make requests of multi-node database server mds11, such as a request for execution of a query, application appl11 is configured to invoke functions of client-side interface component intcomp11, which then transmits a request for the same to the node and database instance on which the session is established.

Client-side interface component intcomp11 may generate and/or access state that is hidden from other software modules, that is, is not or may not be referenced and accessed by other software modules, and in particular, by application appl11. Such state is referred to as being internal or private to client-side interface component intcomp11.

For example, to create a database session on a multi-node database server mds11, application appl11 invokes a routine of client-side interface component intcomp11. The client-side interface component establishes a database session on a particular database instance within multi-node database server mds11, and stores details about the database session within internal data structures or objects. Such data structures and objects define, for example, the session established for an application, and specify such values as an identity of a session on a database instance, the name of the database instance, and a network address and port number for the connection to the database instance.

Such details of the session are not returned to application appl11, nor may application appl11 access the details. Instead, what is provided to application appl11 is an "external identifier" for the session, such as a value that internal data of client-side interface component intcomp11 maps to the session, or a reference to an object generated by client-side interface component intcomp11 to store some details of the session in private attributes of the object that are inaccessible to application appl11. In this way, application appl11 does not "know" of the specific details of the session that has been established for it; however, application appl11 has the information needed to be able to identify to client-side interface component intcomp11 the particular session that has been established for application appl11.

Distributing Workload

An important capability needed to manage multi-node database servers is to distribute work load between the nodes. Distributing work load is used to improve performance, by optimally balancing workload between nodes. Distributing workload also allows work to be shifted from a node that is being taken off-line for maintenance operations to another node.

To improve performance, work load on a multi-node database server is distributed using connection-time balancing.

Under connection-time balancing, work load is distributed at connection-time, when a database session for a client is created. Specifically, when a client requests to establish a database session on a multi-node database server, the session is placed on an instance or node based on work load considerations. For example, a client transmits a request for a session to a multi-node database server. The multi-node database server determines that a node is less busy than other nodes, and establishes a session for the client on that node.

A drawback to connection-time balancing is that it cannot rebalance existing sessions; it only balances sessions when they created. The work load created by existing sessions cannot be shifted and does not abate until a client, on its own accord, reduces or ceases to make requests and/or terminates the sessions. As a result, the timing of work load shifting is subject to events not under the control of a multi-node database server.

Based on the foregoing, it is clearly desirable to provide a way to shift work load of clients of sessions after the sessions have been created.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
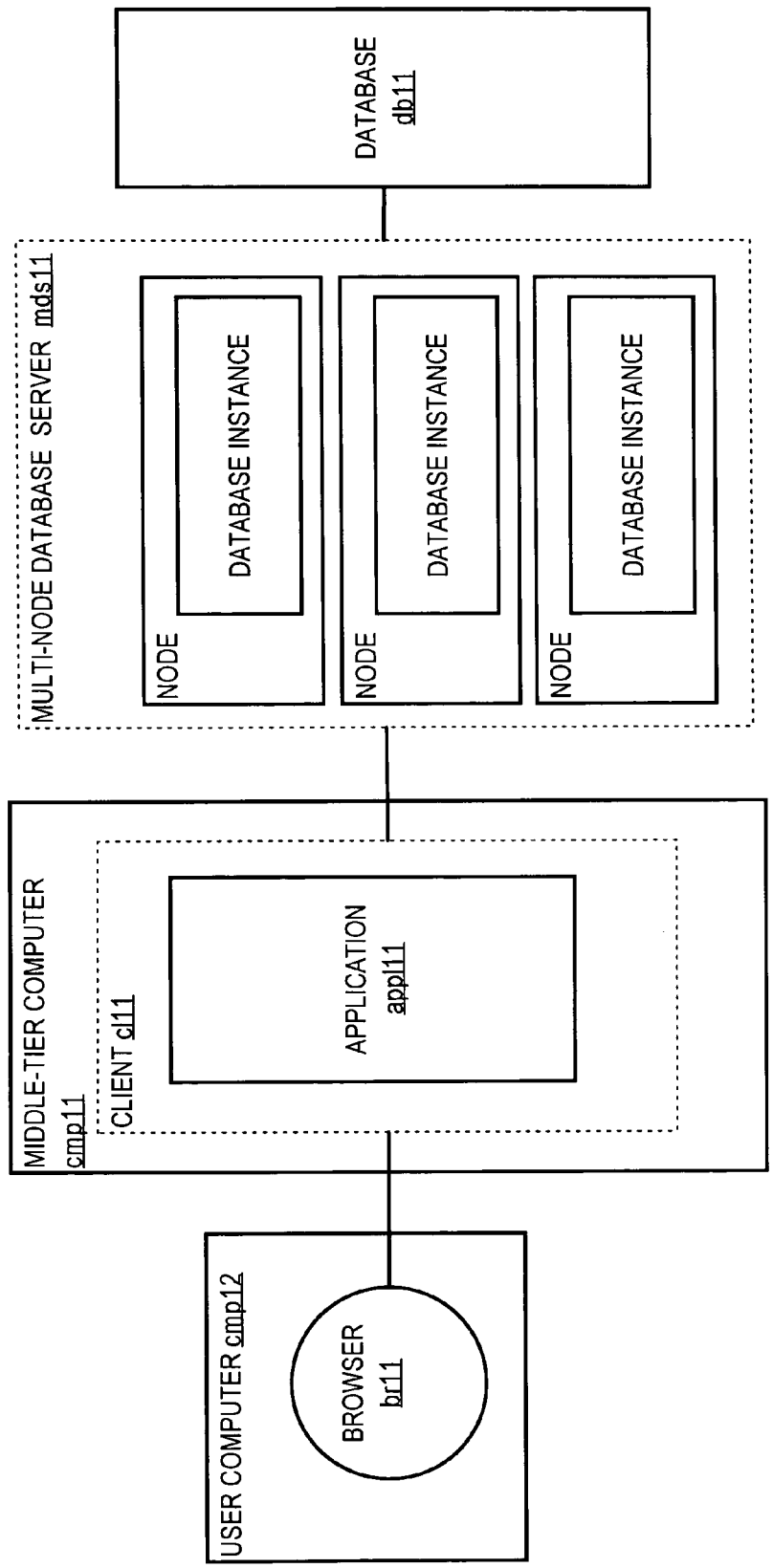
FIG. 1 is a block diagram of a multi-tier architecture for a computer system

Approaches that may be used to transfer sessions in a multi-node environment are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques that allow a client to be switched from a session on a server to another session on another server in a way that is a transparent to the application for which the initial session was established. The term migrate refers to an operation in which a client of an existing session on a server is switched from the existing session to another the session, allowing the existing session to be terminated and the client to use the other session in lieu of the existing session. The existing session is referred to herein as having been migrated. The term "transparent" refers to performing an operation in a way that, with respect to a unit of software, does not require execution of instructions in the unit that are tailored to perform the operation. Thus, under transparent session migration, a client is switched between sessions without executing application instructions tailored to accomplish the migration. Instead, a client-side interface component, through which the application interacts with the server, handles details of migration, modifying the internal state of the client-side interface component to effect the same. Legacy applications do not have to be modified in order to institute techniques described herein.

In transparent migration session, a session is transparently migrated from a "source" server to a "destination" server. In this way, existing sessions can be balanced between servers to improve performance and resource availability.

To migrate a session, the session's state is captured and restored. Capturing a session's state entails producing a stream of bytes, as a veritable copy of a session state of the session, that can be stored in an object, file, or other type of data structure and later accessed to restore the session. Under transparent session migration, the session of a client is captured on a source server, producing a stream of bytes that is stored in a data structure and transported to the destination server, where the destination server restores the session by loading the stream of bytes into a session on the destination server that was established for the client.

The participants of session migration may include a client on a computer, a source server and a destination server, each located on a different node in a multi-node system. The participants follow a variation of a protocol that allows session migration to occur transparently to an application or other software module for which the session was established. Hence, the protocol is referred to as a transparent session migration protocol. The protocol allows recovery processing if any session migration operations fail.

According to an embodiment, session state can be viewed as a union or combination of "component session states". A component session state is specifically generated and used by a database component. Session state can be a combination of complex component states; developing software that generates and restores a copy of a component session state is equally complex. Described herein is an extensible framework that facilitates the development and deployment of such software. The extensible framework defines an interface for callback functions that are invoked to capture and restore component session state, and to determine whether a component session state permits a session to be migrated.

While the extensible framework is illustrated using session migration, the framework is not limited to this use. It can be applied to any use in which session state is captured, stored, and than later restored for a session.

Illustrative Computer System

Figure 2:
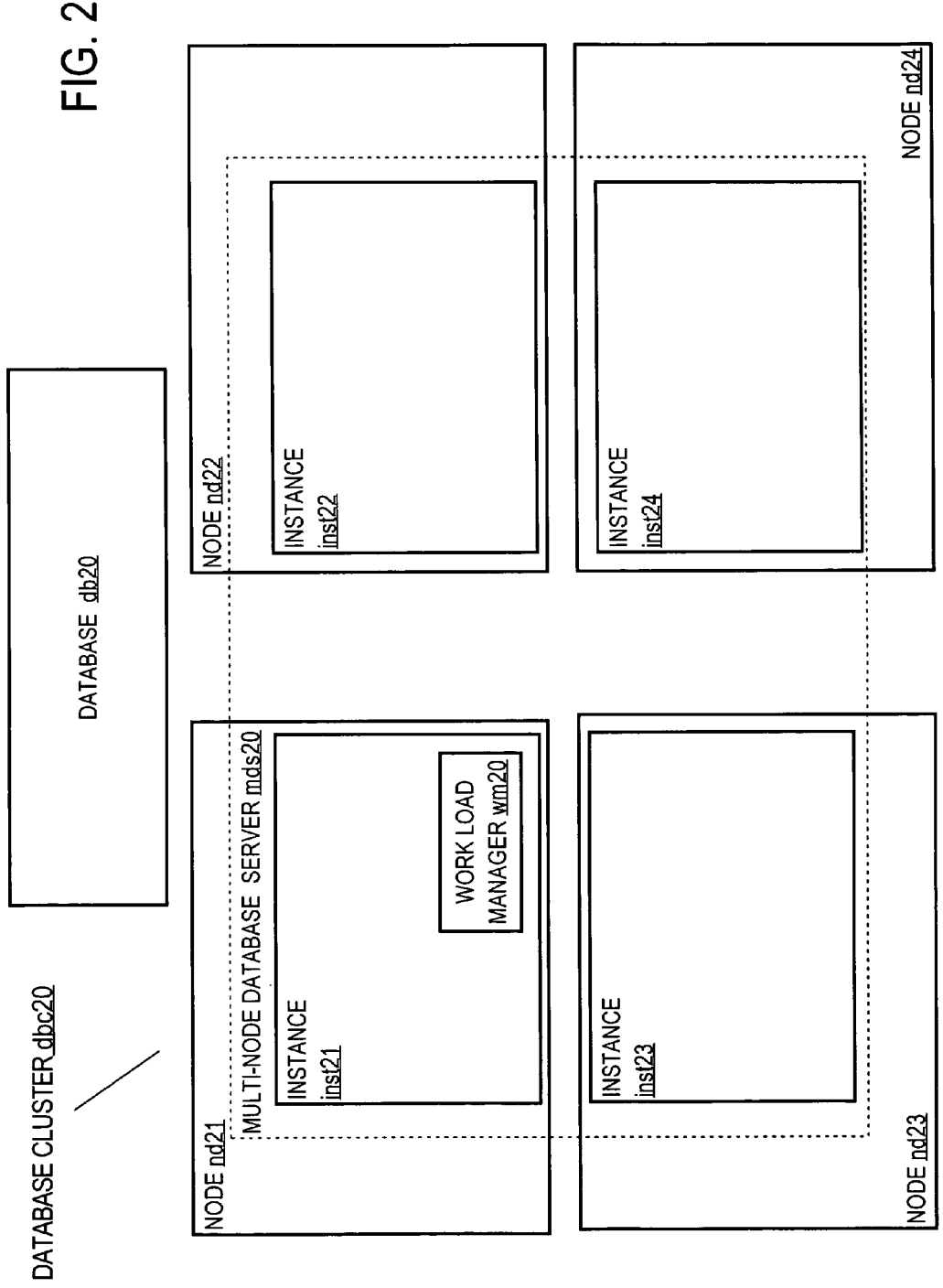
FIG. 2 is a block diagram showing a multi-node computer system on which an embodiment of the present invention may be implemented according to an embodiment of the present invention.

FIG. 2 shows a multi-node computer system that may be used to implement an embodiment of the present invention. Referring to FIG. 2, it shows database cluster dbc20. A database cluster is a set of nodes that host a multi-node database server, such as multi-node database server mds20, that manages access to a particular database. Database cluster dbc20 includes nodes nd21, nd22, nd23, and nd24. The nodes of database cluster dbc20 provide some degree of shared storage (e.g. shared access to a set of disk drives) between the nodes. The nodes in database cluster dbc20 may be in the form of computers (e.g. work stations, personal computers) interconnected via a network, and may be part of a grid. Database server mds20 includes database instances inst21, inst22, inst23, and inst24.

Clients that connect to a database instance that is part of a multi-node database server to access the database managed by the database instance, are referred to herein as clients of the database instance, clients of the multi-node database server, or clients of the database. For example, a process on a computer not part of database cluster dbc20 executes an application and is connected to database instance inst23 to access database db20. The process is referred to as a client of database instance inst23, a client of multi-node database server mds20, and a client of database db20.

Work load manager wm20 is a process running on database cluster dbc20, and in particular, instance inst21, that is responsible for managing work load on the database instances hosted on database cluster dbc20. An example of a work load manager is a database director, described in Incremental Run-Time Session Balancing, which performs run-time session balancing by migrating one or more sessions from a source database instance to a destination database instance.

Sessions Established for Clients by a Listener

In order for a client to interact with multi-node database server mds20, the client transmits a database connection request to establish a session on a database instance. A listener receives the request. A listener is a process running on database cluster dbc20 that receives requests and directs them to a database instance within database cluster dbc20.

Once the database session is established for the client, the client may issue additional requests, which may be in the form of remote procedure invocations, and which include requests to begin execution of a transaction, to execute queries, to perform updates and other types of transaction operations, to commit or otherwise terminate a transaction, and to terminate a database session.

Illustrative Client and Source and Destination Instance

Figure 3:
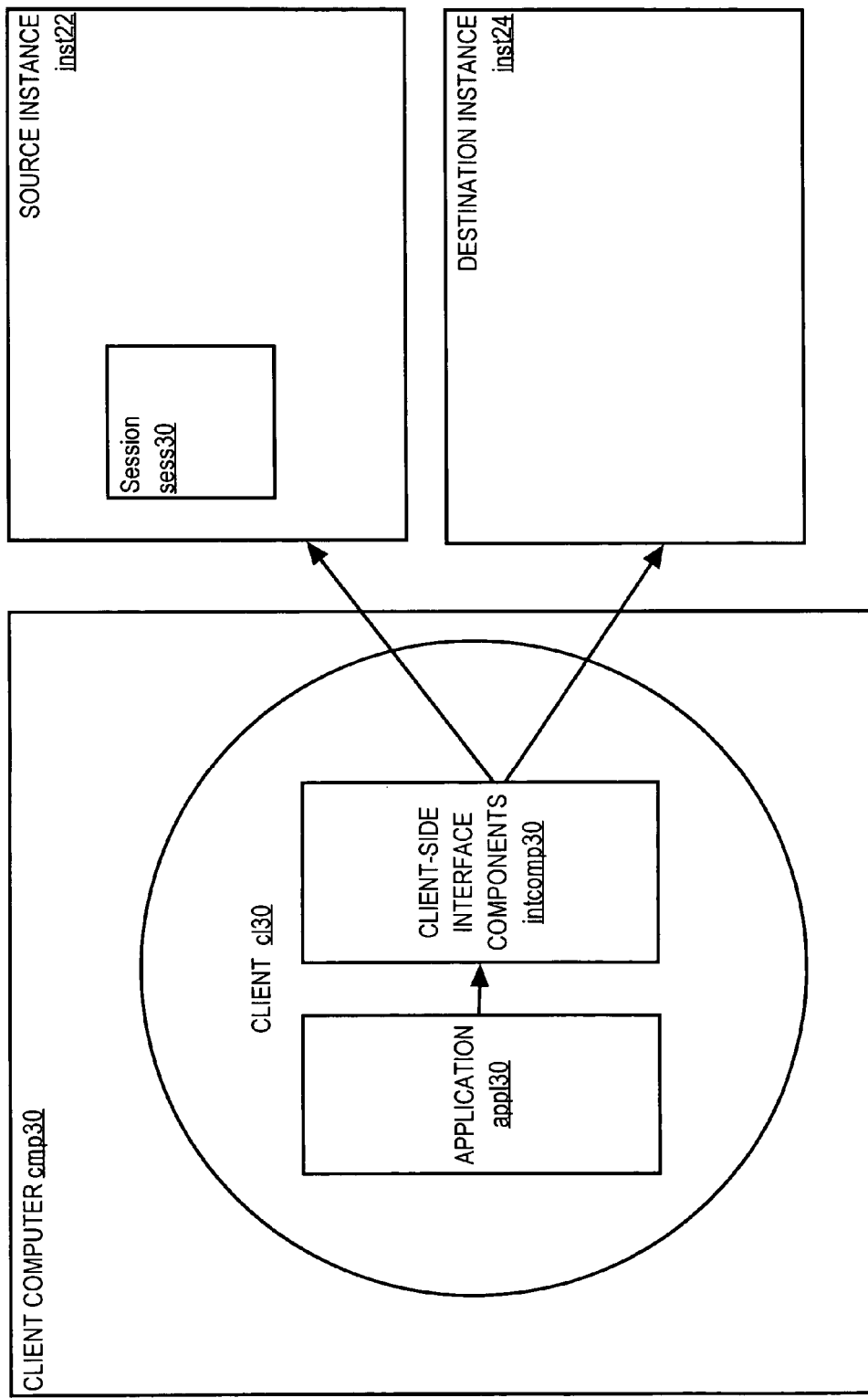
FIG. 3 is a block diagram depicting a client, source database instance, and destination database instance that participate in migrating a session according to an embodiment of the present invention.

FIG. 3 is a block diagram showing an illustrative client and source and destination instance used to illustrate transparent session migration according to an embodiment of the present invention. Referring to FIG. 3, it shows database instance inst22 and inst24 as source instance inst22 and destination instance inst24. Client cl30 is a process that is running on a client computer cmp30. Client computer cmp30 is a computer that is separate from any node in database cluster dbc20 and that hosts one or more database clients of database cluster dbc20, including client cl30. Clients hosted by client computer cmp30 include processes that execute an application, such as application appl30, which is executed by client cl30.

Application appl30 interacts with database cluster dbc20 and multi-node database server mds20 via client-side interface component intcomp30. Application appl30 includes invocations of routines (e.g. functions, procedures, object methods, remote procedures) of client-side interface component intcomp30. An example of a client-side interface component is the Oracle Call Interface ("OCI"), available from Oracle Corporation.

For purposes of exposition, software modules, such as application appl30, are described herein as performing particular actions, when in fact execution of the software by a process causes the process to perform those actions. For example, when an application appl30 is described as transmitting or receiving a message or accessing data, a process executing the application software is transmitting or receiving the message or accessing the data.

Calls

A call is a request made by a client to a server to execute a task. Typically, a call is made by a process executing an invocation of a routine in a software module. The invocation causes the process to execute the routine (such execution may itself entail calling and executing other routines), and then to return to execute the module to a point at or just beyond the invocation (or some other designated point e.g. exception handler).

A call may entail passing in one or more input parameters to the invoked routine and returning values as one or more output parameters. Messages may be transmitted as part of an input parameter and part of an output parameter. A call to a database instance typically is made to perform a task, such as executing a database statement. A message transmitted by the call may include a query string as an input parameter, and query results or a reference to their location as an output parameter.

A remote procedure call is a call of a routine made by a process in which another process, on the same or different node and/or computer, executes the called routine. The other process is referred to as the remote process. The call is made by transmitting a request to execute a routine to another process over a communication connection, such as a network connection. Also, input parameters and output parameters are transmitted over the connection. While the remote process executes the procedure, the calling process's execution is suspended or blocked.

A call causes the calling process or remote process to execute the called routine, which may cause calling and execution of other routines. The call terminates when the call returns. Operations, which are carried out as part of execution of a called routine, are referred as being made within the call.

For example, to make a call to database cluster dbc20, application appl30 makes a call of a function of client-side interface component intcomp30. In response to the invocation, client-side interface component intcomp30 executes the call, which entails client-side interface component intcomp30 modifying and accessing "local" data stored in the memory of client computer cmp30 by client-side interface component intcomp30, and client-side interface component intcomp30 making multiple remote procedure calls to source instance inst22, the multiple remote procedure calls including a first remote procedure call and a second remote procedure call. In response to the first remote procedure call, source instance inst22 performs various operations. The modification and access of the local data, the multiple remote procedure calls, and the various operations performed by source instance inst22, are referred to as being performed within the "application call" made by application appl30. The various operations performed by source instance inst22 while executing the routine invoked by the first remote procedure call (which may entail execution of other routines) are referred to herein as being made within the first remote procedure call, within a client-side call because the first remote procedure call was made by the client-side interface component intcomp30, and within an application call because the remote procedure call was made by client-side interface component intcomp30 while executing a routine called by application appl30. An application call or client-side call may both be referred to herein as a client call.

Transparent Session Migration Protocol

Figure 4:
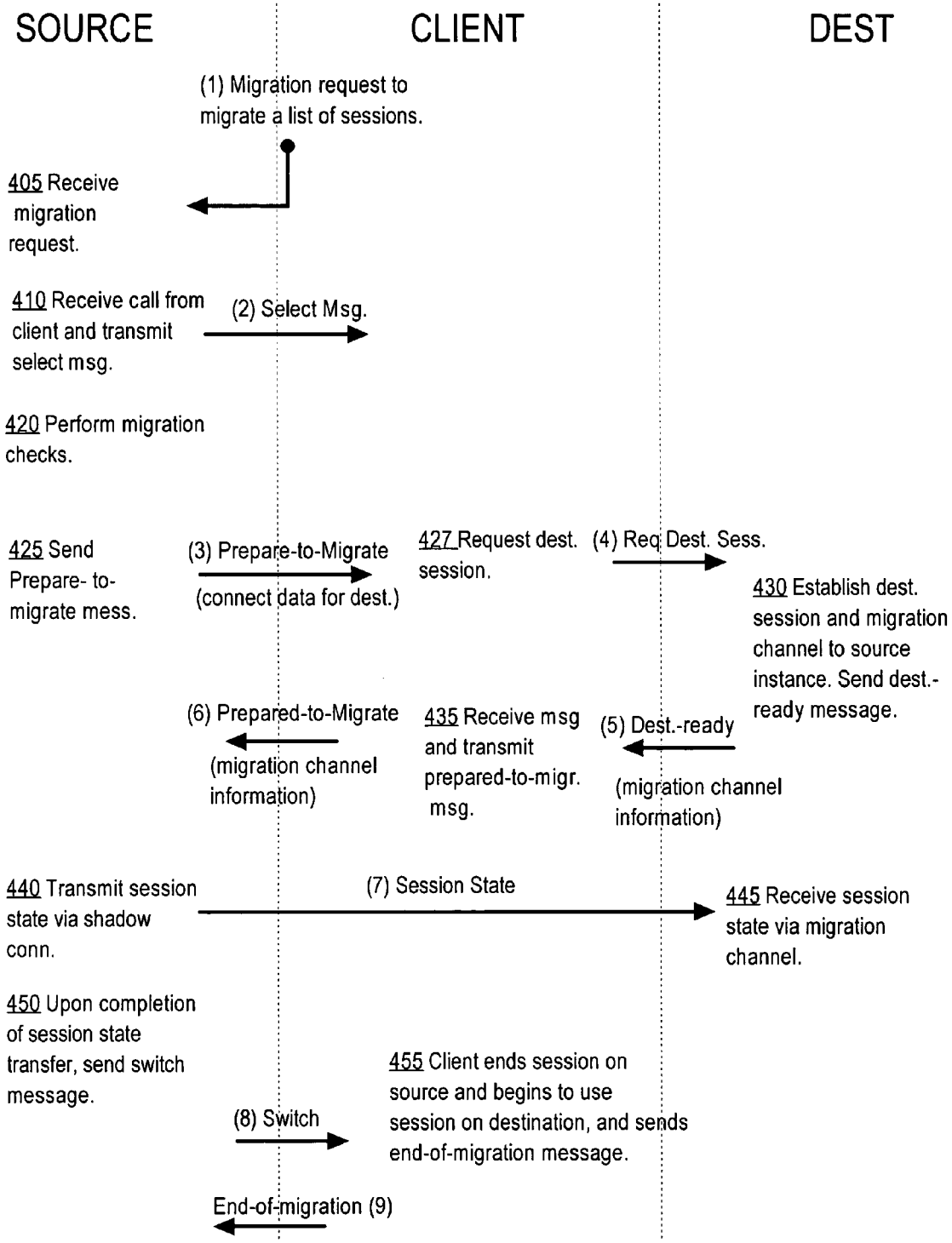
FIG. 4 is an entity-interaction diagram showing a protocol for migrating sessions between servers according to an embodiment of the present invention.

FIG. 4 is an entity-interaction diagram used to illustrate a protocol for transparent session migration. The protocol is illustrated using client cl30, source instance inst22, and destination instance inst24 as participants in the protocol. The protocol is initiated by a migration initiator, which is an entity that determines and/or requests that a set of sessions is to be migrated. For example, work load manager wm20 may determine that a set of sessions be migrated from source instance inst22 to destination instance inst24 to shift work load from source instance inst22 to destination instance inst24. Work load manager wm20 generates a request to migrate the set of sessions. Work load manager wm20 requesting migration of sessions to shift work load between database instances is just one example of an entity and purpose for requesting session migration; there may be other types of entities that request that a set of sessions be migrated for other types of purposes. For example, an entity responsible for shutting down a database instance may migrate all sessions currently being hosted by the database instance so that the database instance may be shut down.

At step 405, source instance inst22 receives migration request 2, which is a request to migrate a list of one or more sessions. The request is transmitted from a session migration initiator, such as work load manager wm20. A session selected or otherwise designated for session migration is referred to herein as a selected session. For purposes of illustration, the list of sessions to migrate includes only one selected session, source session sess30 (see FIG. 3).

At step 410, source instance inst22 waits for a call from a client for source session sess30 and intercepts the call to send select message 3 to the client. The call is referred to as being intercepted because although the call is being used to effect some action related to session migration, an action such as sending select message 3, the call was made for some purpose other than to effect such action, such as requesting execution of a query. The output parameters returned to the client include "output data structures" that may have multiple attributes. Source instance inst22 transmits select message 3 by setting one or more the attributes of the output parameters to a particular value.

At step 420, source instance inst22 performs migration checks, that is, determines whether migration criteria are satisfied. If the migration criteria are satisfied, then execution of the protocol proceeds to step 425.

Migration Criteria

Figure 5:
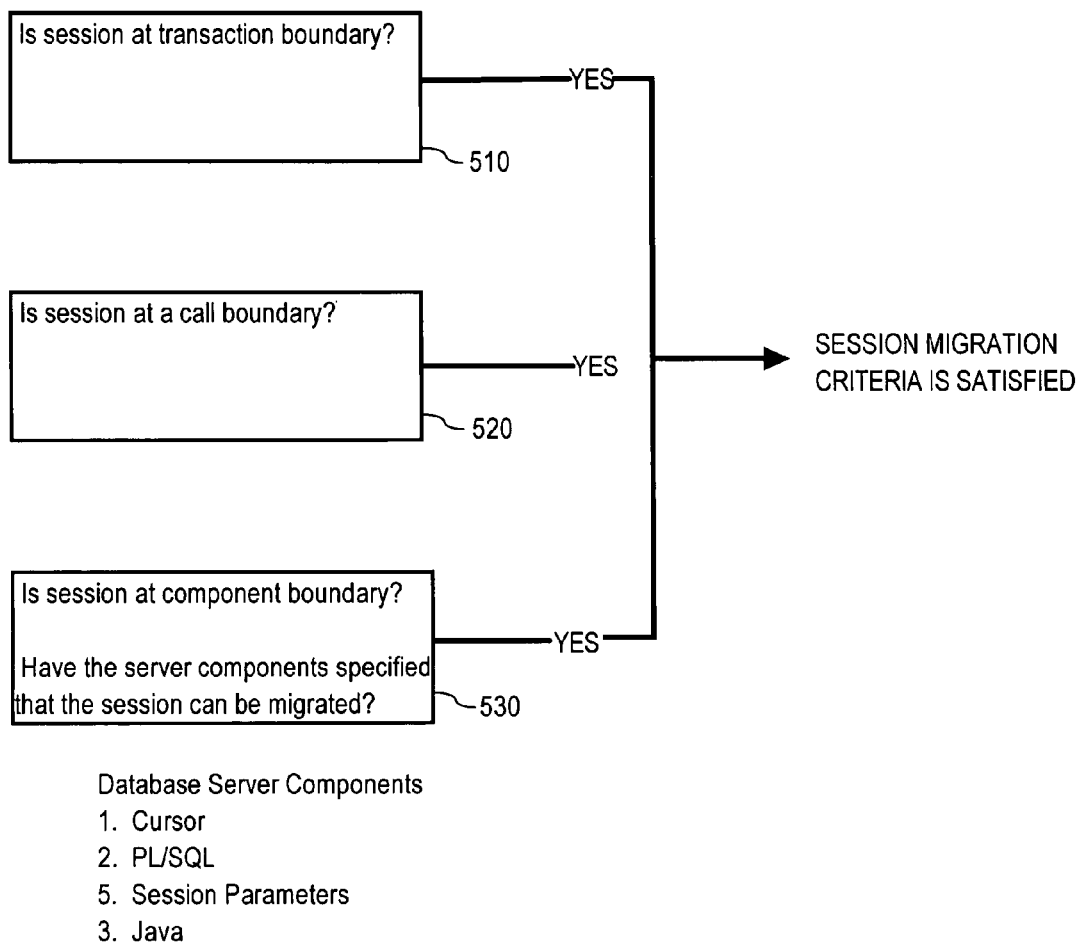
FIG. 5 is a block diagram depicting migration criteria and its use to determine whether to migrate a session according to an embodiment of the present invention.

FIG. 5 is a block diagram depicting use of three kinds of migration criterion according to an embodiment. Referring to FIG. 5, at block 510, it is determined whether source session sess30 is at a transaction boundary; at block 520, it is determined whether source session sess30 is at a call boundary; at block 530, it is determine whether source session sess30 is at a component boundary.

A session is at a transaction boundary if there are currently no active transactions being executed for the session. A transaction is a logical unit of work that is performed as an atomic unit. In the context of database systems, the database must reflect all the changes made by a transaction, or none of the changes made by the transaction to ensure of the integrity of the database. Consequently, none of the changes made by a transaction are permanently applied to a database until the transaction has been fully executed. A transaction is said to "commit" when the changes made by the transaction are made permanent. A transaction is active if the transaction has not been committed, aborted, or otherwise terminated.

A session is at a call boundary if a database instance has finished executing a client call rather being at an intermediate stage of processing the call.

For example, to process a call to execute a database statement, a database instance goes through stages, each stage corresponding to a particular type of operation. The stages are (1) creating a cursor, (2) parsing the database statement and binding its variables, (3) executing the database statement, (4) fetching the rows to return for the query, and (5) closing the cursor. These stages are described in greater detail in Oracle8 Server Concepts, Release 8.0, Volume 3 (the contents of which incorporated herein by reference), at chapter 23. Intermediate stages are the operations performed before processing of the call is complete. In the current example, the intermediate stages are stages (1)-(5). After source instance inst22 performs step (5) in response to a call, source session sess30 is at a call boundary.

A session is at a component boundary if each database component of a session is at its respective component boundary. As mentioned before, database components use a portion of session state, referred to herein as component session state. A session, such as source session sess30, is at a component boundary for a particular database component if the component session state of the database component can be migrated to another session.

Illustrative Database components

Figure 6:
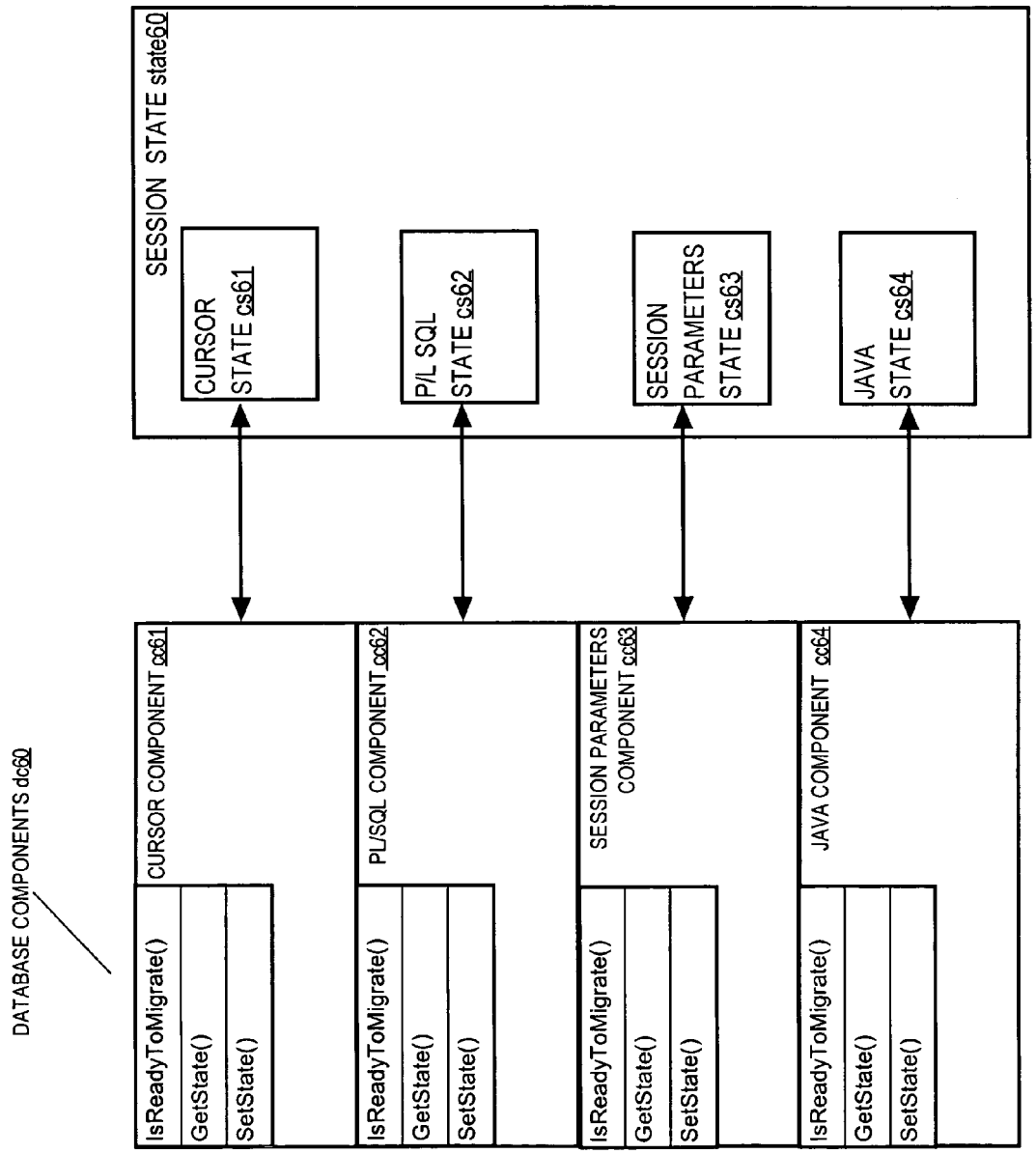
FIG. 6 is a block diagram depicting database components that use a portion of a session state of sessions according to an embodiment of the present invention.

FIG. 6 depicts an illustrative set of database components dc60 and their respective component session states within session state state60. Session state state60 is the session state for source session sess30. FIG. 6 shows the following database components: cursor component cc61, PL/SQL component cc62, session parameter component cc63, and Java component cc64.

Cursor component cc61 is used to manage cursors within a database instance, such as source instance inst22 and destination instance inst24. A cursor is an area of memory used to store information about a parsed database statement and other information related to the processing of the database statement. Cursor component cc61 uses and stores information in cursor state cs61, a component session state within session state state60.

PL/SQL component cc62 is responsible for executing code (e.g. procedures) written in PL/SQL, a procedural database language promulgated by Oracle Corporation. The components use component session state PL/SQL state cs62 to store information related to the execution of PL/SQL code, such as variable values and parsed PL/SQL statements.

Session parameters component cc63 is responsible for managing attributes that generally control how calls and requests associated with a session are processed. The attributes are stored in component session state parameters state cs63. For example, session parameters can include an attribute that controls the particular human language for results returned by executing queries.

Java component cc64 is responsible for executing code (e.g. class and object methods) written in Java. The components use component session state Java state cs64 to store information related to the execution of Java code.

Cursor component cc61, PL/SQL component cc62, session parameter component cc63, and Java component cc64 each include a database component interface that conforms to an interface definition. An interface definition defines a set of routines, typically functions, and values returned by those routines. Examples of an interface definition include an object class defined in a computer language, an interface described by an interface definition language (e.g. OMG Interface Definition Language), or a specification written in a human language that describes the interface. Functions of a database component interface support the transfer of component session state between sessions. According to an embodiment, the interface includes three functions: IsReadyToMigrate( ), GetState( ), and SetState( ).

IsReadyToMigrate( ) is invoked to cause a database component to determine whether or not the component session state of a database component for a session can be migrated to the session space of another session. The function returns a result indicating whether or not the component session state may be migrated. For example, when the IsReadyToMigrate( ) function of PL/SQL component cc62 is invoked, PL/SQL component cc62 determines that it is storing a file descriptor of an open file within PL/SQL state cs62. The file descriptor contains information that is only valid for a session on source instance inst22 but not destination instance inst24, and therefore PL/SQL component cc62 returns a value indicating that PL/SQL state cs62 cannot be migrated.

The function GetState( ) is invoked to cause a database component to generate a copy of component session state for a session. The function SetState( ) is invoked to cause a database component to load (i.e. add) a copy of a component session state to the session state of a target session.

The component session state returned by the GetState( ) function is opaque, in that the one or more entities that participate in transferring the returned copy of the component session state do not have to know about the particular structure of the component session state. The entities simply invoke the GetState( ) function to capture the component session state of a database component and load the returned copy of the component session state by invoking and passing the copy to SetState( ).

The determination of whether source session sess30 is at the component boundary for each database component is made by invoking the IsReadyToMigrate( ) function for each database component that could be using component session state. If all such invocations return a value indicating that the respective component session state can be migrated, then the determination at block 530 is that the source session sess30 is at a component boundary for each database component.

Prepare to Migrate

Once source instance inst22 has determined at step 420 that the migration criteria is satisfied, at step 425 source instance inst22 transmits a prepare-to-migrate message 4 to the client. Step 425 is performed by intercepting a call. The prepare-to-migrate message 4 is transmitted via an output data structure returned for the intercepted call. The prepare-to-migrate message 4 and the select message 2 may be returned in the same client call.

The prepare-to-migrate message contains the connect information for establishing a connection to destination instance inst24. The purpose of the connection is to establish a destination session on destination instance inst24 and to initiate the destination instances participation in migrating source session sess30.

The intercepted call was initiated within an application call from application appl30. The remainder of the protocol is performed within this application call. The intercepted client is referred to herein as a "seed call" because client cl30 must make the call to initiate the remainder of the protocol and complete session migration.

At step 427, client cl30 transmits a request to establish a destination session to destination instance inst24. Establishing a session on a database instance may require authenticating client cl30. To authenticate client cl30, authenticating information (e.g. user name and password) is supplied to source instance inst22 by client-side interface component intcomp30. Client-side interface component intcomp30 had received the authentication information earlier from application appl30 to establish a session on database cluster dbc20.

Client cl30 sets session parameters of the destination session to the same values as those of source session sess30. The client-side interface component intcomp30, which had supplied the values to source instance inst22 for source session sess30, has retained these values and uses them to set the session parameters of destination instance inst24.

At step 430, destination instance inst24 establishes the destination session and a "migration channel", which is a communication channel between the source instance and destination instance that is used to transfer session state between them.

In an embodiment of the present invention, the migration channel is established. In some database servers, for each session, the database server receives incoming messages at only one end point (e.g. a port number associated with a port). The single end point is typically used for a connection to communicate with the client. The connection, for example, is used by the client to transmit database statements and by a database instance to transmit query results, or to transmit messages such as those discussed above. The single end point for a session is referred to herein as the session's incoming end point.

To transfer session state of a selected session, a new and different incoming end point on destination instance inst24, referred to as a shadow port, is used for the migration channel. Destination instance inst24 listens for and accepts a connection request from source instance inst22 at the shadow port. For example, a new socket may be created for the shadow port, and used as the session's incoming end point. Destination instance inst24 listens for and accepts a connection request from source instance inst22 at the new socket.

Next, destination instance inst24 sends a destination-ready message 6 to client cl30. The destination-ready message 6 includes the migration channel information, which includes information sufficient for source instance inst22 to connect to destination instance inst24 via the migration channel. The migration channel includes, for example, the port number of the shadow port.

At step 435, client cl30 receives destination-ready message 6 and transmits a prepared-to-migrate message 7 to source instance inst22. The migration channel information is sent with the message.

Source instance inst22 receives the prepared-to-migrate message 7.

At step 440, the source instance inst22 transfers session state 7 to destination instance inst24 via the migration channel. First, source instance inst22 establishes, based on the received migration channel information, a "migration connection" with destination instance inst24 via the migration channel. In an embodiment, for a particular database component, source instance inst22 invokes the respective Get State( ) function, stores the returned copy of the component session state, and transmits the copy via the migration connection to destination instance inst24.

At step 445, destination instance inst24 receives the component session state transmitted along the migration connection, and invokes, for each component session state of a database component sent, the respective SetState( ) function, loading the component session state to the session state of the destination session.

The transfer of session state between source instance inst22 and destination instance inst24 may be performed in such a way that source instance inst22 and destination instance inst24 perform their work concurrently. For example, function GetState( ) may return only a portion of a component session state of a session component, and may be invoked multiple times to retrieve all the component session state. When source instance inst22 retrieves a portion by invoking GetState( ), source instance inst22 transmits the portion to destination instance inst24, and then invokes GetState( ) again to retrieve another portion. When destination instance inst24 receives a portion, destination instance inst24 calls SetSate( ) to transfer the portion to the destination session state. Thus, source instance inst22 may be retrieving a portion of session state while destination instance inst24 is loading a portion of session state. In this way, source instance inst22 and destination instance inst24 concurrently perform their respective operations for transferring component session state.

After completing transfer of session state from the source session to destination instance inst24, the migration connection is terminated. Destination instance inst24 changes the incoming end point of the destination session sess30 back to the client end point.

At step 450, source instance inst22 transmits a switch message 8 to client cl30, informing client cl30 that it may switch to the destination session. Switch message 8 may be sent to client cl30 as part the client call in which the prepared-to-migrate message was sent, by returning the message as an output parameter value of the call. The message may also be returned as part of a subsequent client cl30 call.

At step 455, in response to receiving the switch message 8, client cl30 switches to the destination session. The internal state of client-side interface components, such as internal data that maps the external identifier of the source session, is modified to reflect that the destination session is now the client's session. Next, client cl30 transmits an end-of-migration message to source instance inst22. The end-of-migration message 9 contains data indicating that client cl30 and/or destination instance inst24 have successfully completed their respective portion of session migration. As explained later in greater detail, the end-of-migration message 9 is used to communicate whether or not session migration has been completed successfully. Finally, client cl30 sends a message to source instance inst22 to terminate the source session. In subsequent client and application calls by client cl30, the destination session is used in lieu of the source session.

Steps 420 through 455 are performed within a single application call. The application does not know or need to know that the particular database session associated with the external session identifier when the application call was commenced is not the same as when the application call returns. No application instructions tailored to handle session migration of a database session had to be executed in order to migrate the session. In this way, the database session has been migrated transparently to the application.

Kick Starting Synchronously Performed Session Migration

With respect to a session migration requested by a call, session migration may be performed asynchronously or synchronously. When performed synchronously, the call returns after session migration of the requested session has been completed. The caller is blocked until completion of session migration. When performed asynchronously, the caller's execution is not blocked while the requested session migration is being performed. The call can return before session migration is completed.

As mentioned before, the completion of the session migration protocol depicted in FIG. 4 depends on a seed call received from the client. The initiation of session migration is delayed until the seed call is made. The delay may be substantial. For example, a client cl30 executes a browser and generates application calls to source instance inst22 in response to a human user manipulating a graphical interface of a browser. The human user, pausing to read the browser output or leaving for a break, may not manipulate the graphical interface for a long period of time, delaying issuance of an application call and a seed call. A session migration request made synchronously may thus be blocked for a substantial period of time.

To avoid such a long delay, a synchronously performed session migration can be initiated. If, after a call is made that requests synchronous session migration of a session, a period of time expires without a seed call being received, then a message, referred to as a seed call request, is sent to the client of the session to request that the client make a seed call. The seed call request may be, for example, a simple ping initiated by source instance inst22 to client cl30.

In an embodiment, the progress of session migration is tracked using a migration tracking mechanism (such as described later in greater detail) that generates migration-progress data. The migration-progress data indicates what stage session migration has been reached. The migration initiator specifies a "migration timeout period" in which migration of a session must be performed or aborted. If by a portion of the migration time-out period migration-progress data indicates that session migration has not reached the stage where the seed call has been made, then a seed call request is generated.

A seed call request may not only be initiated by source instance inst22 but also by, for example, a migration initiator. In an embodiment, a migration initiator, after making a request to migrate a session, invokes an API function of source instance inst22 to get migration-progress data. The migration initiator determines, based on certain criteria, whether or not to issue a seed call request to the client. Alternately, a migration initiator may issue a seed call request to clients of selected sessions automatically after making a migration request to migrate sessions.

Recoverability

As the transparent session migration progresses, source instance inst22, destination instance inst24, and client cl30 transition between migration stages. These migration stages represent the progress of session migration, and may be tracked and reported and used to derive migration-progress data. Furthermore, a failure may be encountered during session migration of a session, requiring the performance of recovery operations. The particular operations performed depend on the migration stage reached when the failure was encountered.

Figure 7:
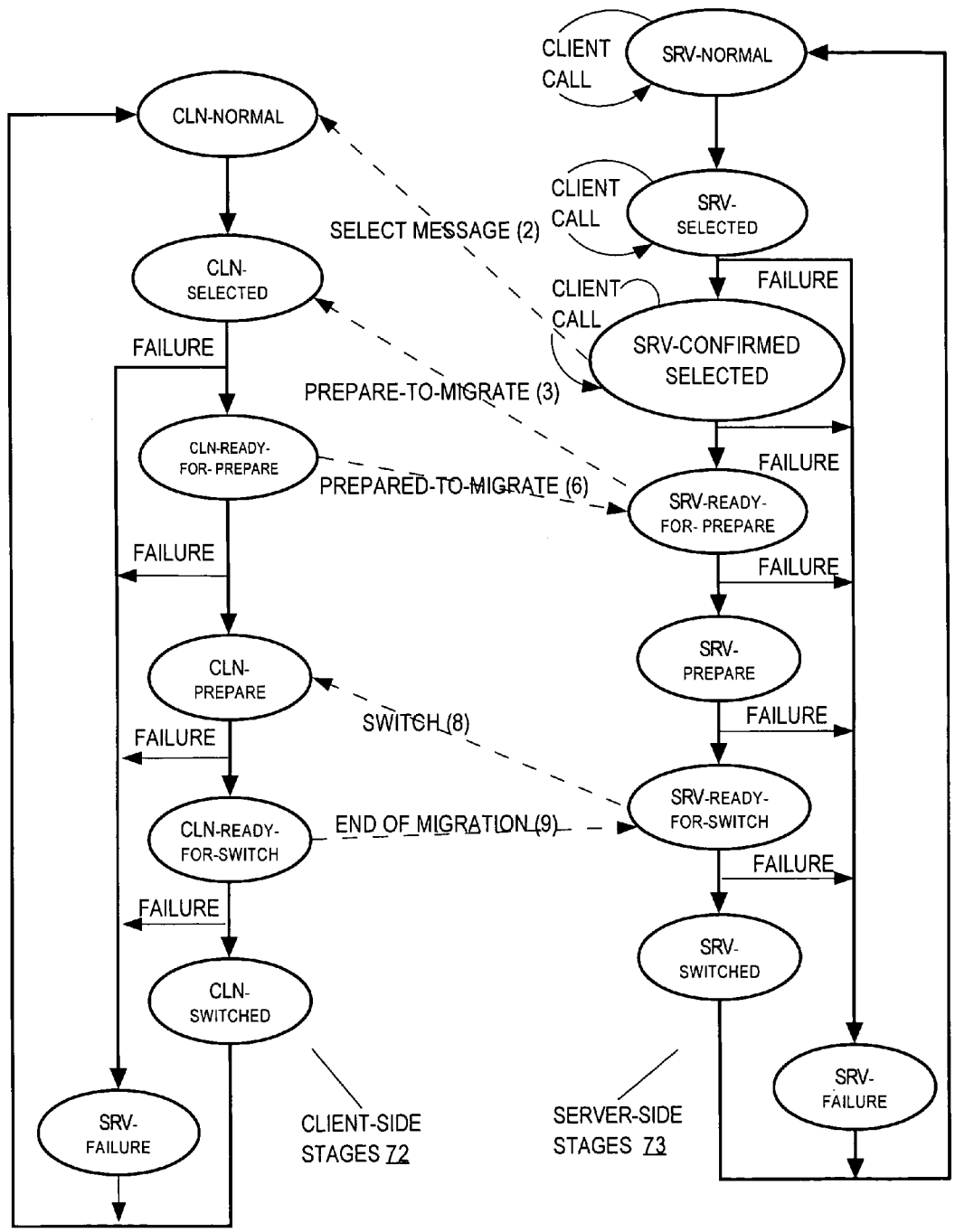
FIG. 7 is a stage-transition diagram depicting stages of session migration according to an embodiment of the present invention.
Figure 8:
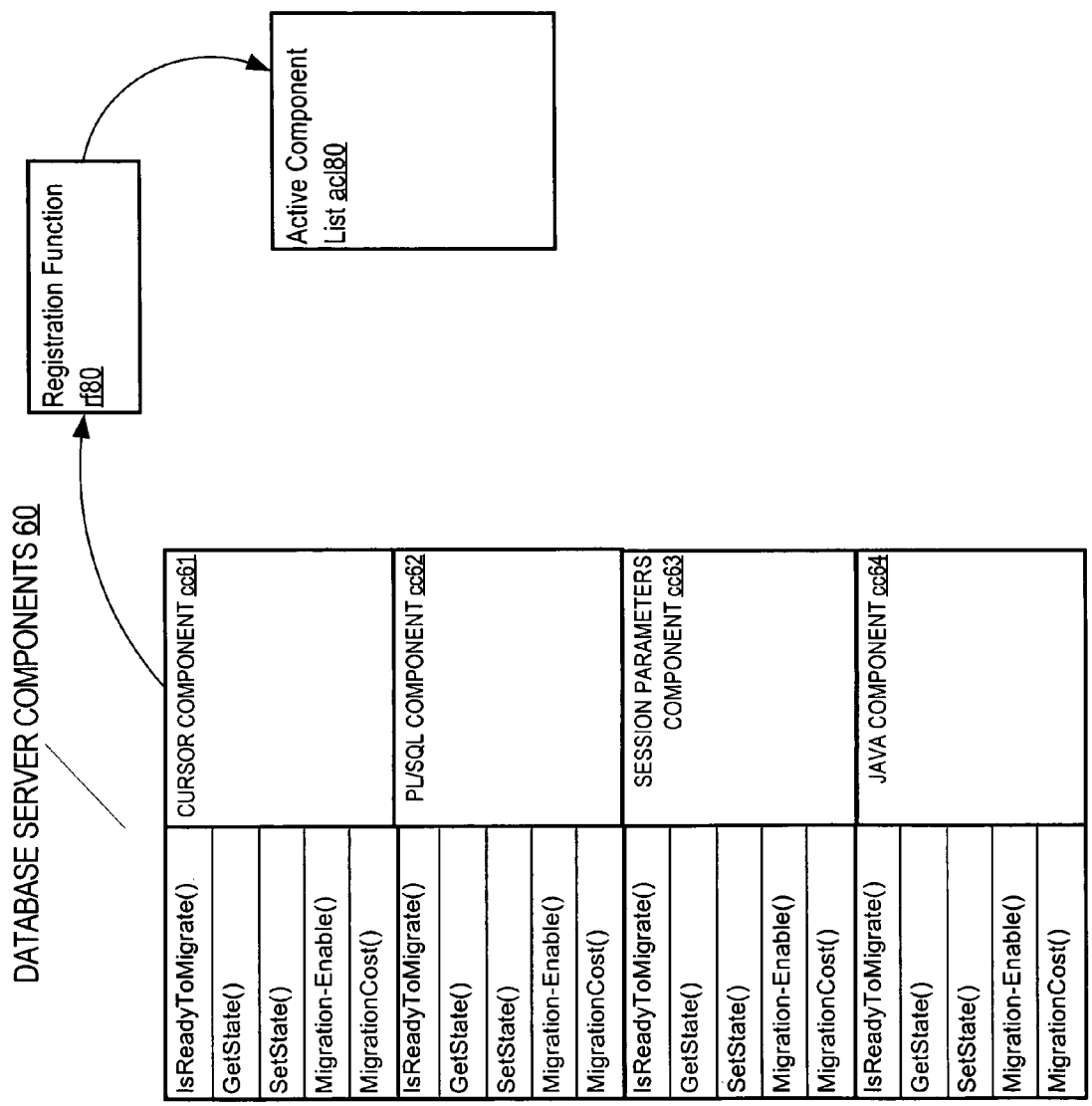
FIG. 8 shows various components of an extensible framework for database components responsible for capturing and loading session state of sessions according to an embodiment of the present invention.

FIG. 7 is a stage-transition diagram showing various migration stages which participants of session migration transition between during session migration. The occurrence of various events or the completion of certain operations causes transition between migration stages. Client-side stages 72 correspond to migration stages of client cl30, while server-side stages 73 correspond to migration stages of multi-node database server mds20.

Referring to FIG. 7, stage SRC-NORMAL is the server-side stage that corresponds to multi-node database server mds20 not being in the process of performing session migration. Multi-node database server mds20 remains at this migration stage until it receives a request to migrate a session. When such a request is received, multi-node database server mds20 transitions to stage SRC-SELECTED, where multi-node database server mds20 transmits a select message 4, and then proceeds to stage SRC-CONFIRMED-SELECTED.

Multi-node database server mds20 then performs migration checks. Once multi-node database server mds20 determines that migration criteria are satisfied, multi-node database server mds20 transitions to stage SRC-READY-FOR-PREPARE. During this stage, multi-node database server mds20 waits for a client call to intercept and uses the call to transmit a prepare-to-migrate message 4 to client cl30. Once multi-node database server mds20 receives prepared-to-migrate message 7, multi-node database server mds20 transitions to stage SRC-PREPARE.

During stage SRC-PREPARE, the source instance inst22 captures session state of the source session and transfers a copy of the session state via the migration connection to destination instance inst24, which adds it to the session state of the destination session. After completing the transfer of source session state, multi-node database server mds20 transitions to the stage SRC-READY-FOR-SWITCH, where source instance inst22 transmits switch message to client cl30. When source instance inst22 receives an end-of-migration message 9 from client cl30, indicating successful switching to the destination session, multi-node database server mds20 transitions to the stage SRC-SWITCHED, where such operations as commencing the termination of the source session are performed.

After completion of stage SRC-SWITCHED, multi-node database server mds20 transitions to normal stage acl80.

Client-side Stages

Analogous to service-side stages, client-side stages include a stage CLN-NORMAL, which corresponds to client cl30 not being in the process of participating in session migration. Once client cl30 receives select message 3, client cl30 transitions to stage CLN-SELECTED. When client cl30 receives the prepare-to-migrate message 4, client cl30 then transitions to stage CLN-READY-FOR-PREPARE. During this stage, client cl30 performs such operations as establishing a destination session, establishing session parameters of the destination session, and receiving a destination-ready message 6 from destination instance inst24. Once this message is received, client cl30 transmits prepared-to-migrate message 7 to source instance inst22 and transitions to stage CLN-PREPARE.

When client cl30 receives the destination-ready message 6, client cl30 transitions to stage CLN-READY-FOR-SWITCH, where client cl30 transmits an end-of-migration message 9 to source instance inst22 indicating the successful completion of switching. Client cl30 then proceeds to CLN-SWITCHED stage, where the client performs such operations as requesting termination of the source session. Finally, client cl30 transitions to stage CLN-NORMAL.

Recovery

During session migration of a source session, events that prevent or make undesirable completion of session migration may be encountered. Such events are referred to herein as "migration failure events". When a migration failure event is encountered, client cl30 and multi-node database server mds20 transition into stage CLN-FAILURE and SRC-FAILURE, respectively, where recovery operations are performed to enable all participants in the attempted session migration to proceed without completing session migration. The particular set of recovery operations performed depends on the particular migration stage at which the failure was encountered.

For example, after client cl30 receives prepare-to-migrate message 7, client cl30 attempts to establish a destination session on destination instance inst24, but is unable to do so.

Having thus encountered a failure event, client cl30 transitions to stage CLN-FAILURE. As part of stage CLN-FAILURE, client cl30 transmits end-of-migration message 9, which includes data that specifies that client cl30 and the destination instance are unable to perform their portion of session migration, and specifically, specifying that client cl30 is unable to establish a destination session.

When source instance inst22 receives the end-of-migration message 9, it determines that a migration failure event has been encountered. Source instance inst22 then enters stage CLN-FAILURE. At this stage, source instance inst22 may generate "unable-to-migrate data", which is data that indicates that the source session had been selected for migration but was not able to be migrated. The data may also indicate the reason or migration failure event underlying the failed to attempt to migrate, e.g. that a destination session could not be established. Unable-to-migrate data may be useful to and accessed by software and/or processes responsible for selecting sessions for migration, such as work load manager wm20. Work load manager wm20 may forego selecting a session for migration if unable-to-migrate data indicates that an unsuccessful attempt was made to migrate the session recently.

Finally, source instance inst22 completes execution of the client-side call within which source instance inst22 was attempting the failed session migration. Multi-node database server mds20 then re-renters stage SRC-NORMAL.

When the client-side call returns, the application call within which the client-side call was executing returns. Client cl30 then leaves stage CLN-FAILURE and enters stage CLN-NORMAL.

Recovery operations may entail releasing resources that are used, allocated and/or otherwise reserved to perform session migration and that are no longer needed.

For example, while multi-node database server mds20 and client cl30 are in stage SRC-PREPARE, source instance inst22 is capturing session state when source instance inst22 detects either that a database component is unable to provide session state or that the migration connection has failed. Having encountered a migration failure event, multi-node database server mds20 enters stage SRC-FAILURE. Source instance inst22 closes the migration connection and de-allocates memory used for the purpose of performing the attempted session migration (e.g. memory used to store capture component session state before transferring it). Rather then sending switch message 8, source instance inst22 transmits an "abort-migration" message to client cl30 indicating that session migration is to be aborted. The message is transmitted via an output parameter of the client call within which the attempted session migration is being performed. When source instance inst22 completes execution of the client call, multi-node database server mds20 then enters stage SRC-NORMAL.

When client cl30 receives the message, client cl30 terminates the destination session. This operation frees memory that had been allocated for the destination session. Client cl30 continues to use source session sess30 rather than using the terminated destination session.

Extensible Session Component Framework

Use of database components enables an extensible framework for session migration. The framework is extensible because it facilitates the development and staging of database components.

FIG. 7 is a block diagram that illustrates features of an extensible database component framework according to an embodiment. FIG. 7 depicts database components 60, registration function rf80 and active component list acl80.

Registration function rf80 is a function of a database server invoked by a database component to dynamically register a handle. The handle allows the database server to invoke a function of a database component interface. A handle may be, for example, a pointer and/or an object reference.

For a given session, not all database components are needed or used. For example, the client of a session may never make a request that requires execution of, for example, PL/SQL or Java. When a database instance determines that it needs a database component for a session, the database instance invokes the database component. This invocation causes the database component to perform initialization operations for the session, which include invoking registration function rf80 and passing in the handle as an input parameter. The database server then adds an entry to active component list acl80; the entry identifies the database component as an active database component of the session.

For a given session on a database server, a database server maintains an active component list acl80, which identifies the active database components for the session and includes the respective handle. To migrate a particular session, a database server only processes active database components, that is, checks the migration boundaries for and migrates the database component session state of only the database components that are active for the session.

Illustrated within FIG. 7 are additional functions that may be included within a database component interface. In addition to functions IsReadyToMigrate( ), GetState( ), SetState( ), the database component interface includes functions Migration-Enabled( ) and MigrationCost( ).

The function Migration-Enabled( ) returns data that indicates, for a particular database component, whether the component session state is capable of being of migrated to another server. In an embodiment, some database components may not have undergone the development needed to support migration of component session state.

The MigrationCost( ) function returns data indicating a cost to migrating a component. In an embodiment, migration checks may be performed to ensure that the cost of migrating a session satisfies cost-related migration criteria. If the individual cost of migrating component session state of a particular database component violates such migration criteria, or the collective cost of migrating component session state violates such migration criteria, then a selected session is not migrated. In addition, the function may provide cost data that can be used for cost-based selection of sessions to migrate.

Delegation of Database Component Development to Specialists

Database components can be highly complex. The responsibility of developing and maintaining database components is usually given to dedicated teams of expert developers that have the training and experience needed to perform the responsibility. Software that captures and loads component session state is also highly complex. Its development is most effectively performed by the development team whose bailiwick a database component falls.

The database component interface allows this development effort to be divided into subtasks that can be allotted to development teams that perform the subtasks effectively. The development team that specializes in a particular database component is allotted to develop the component to enable the components to support the interface, to determine whether a session is at a migration boundary with respect to the database component, and to capture and load the component session state. Furthermore, a development team can be allotted to develop the software module that implements the session migration protocol without having to deal with the complexity of database components. In this way, the development of session migration software may be performed more effectively and efficiently.

Staging of Migration-Enabled Database Component Development

The development of migration-enabled database components may be staged. Not all database components need to be migration-enabled before session migration is instituted on a multi-node database server or server at some level. In earlier releases of a database server product, only a subset of database components need to be migration-enabled. While some sessions, those that have active database components that are not migration-enabled, cannot be migrated, other sessions can be. In later releases, more database components would be migration-enabled, allowing sessions to be migrated under a greater proportion of circumstances.

Checking whether a selected session has an active database component that is not migration-enabled can be performed when migration checks are performed. Detecting that a selected session has an active database component that is not migration-enabled can be treated as a migration failure event.

Other Embodiments

An embodiment of the present invention has been illustrated by dynamically allocating the resources of a multi-node database server in a single tier of a multi-tier system. However, an embodiment of the present invention is not limited to migrating sessions within a database server, or within a single tier of a multi-tier system.

For example, an embodiment of the present invention may be used to migrate sessions in multiple tiers of a multi-tier system that includes a multi-node database server in the first tier, and a multi-node application server in the second tier, where the application server is a client with respect to the database server and browsers that connect to the application server over a network are clients with respect to the application server. The application server is used primarily for storing, providing access to, and executing application code, while a database server is used primarily for storing and providing access to a database for the application server. Transparent session migration may be used to migrate sessions between instances of the application server in a way similar to the way in which sessions are migrated between instances on the database server. An example of an application server is an Oracle 9i Application Server or Oracle 10g Application Server.

Neither is transparent session migration limited to migrating sessions to dynamically balance sessions and workload between servers. For example, sessions may be migrated from a server to allow the server to be taken down for planned down time, or to move sessions to another server when the server becomes available after having been provisioned.

HARDWARE OVERVIEW

Figure 9:
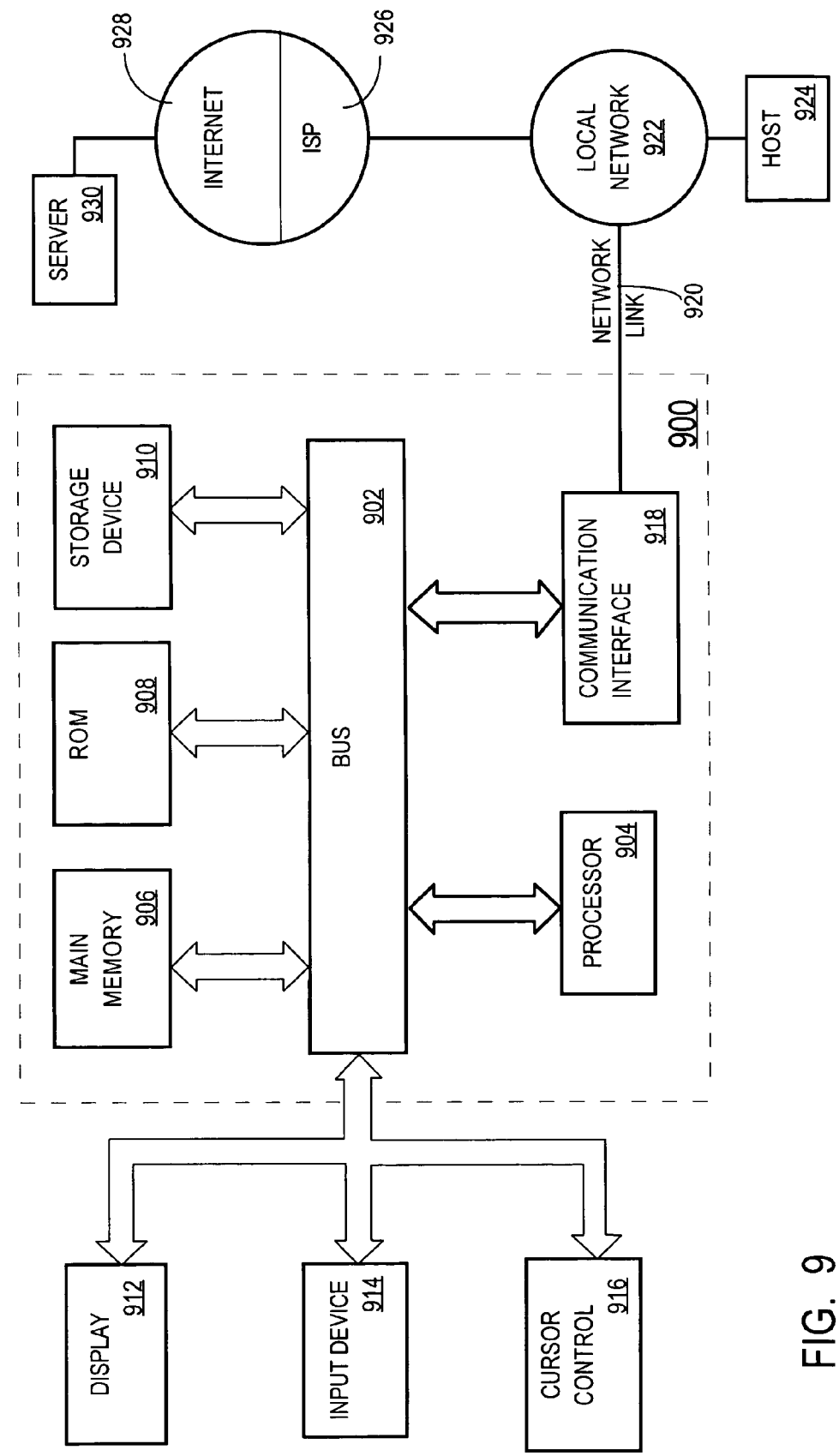
FIG. 9 is a block diagram of a computer system that may be used to implement an embodiment of the present invention.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method used for capturing and restoring a first session state of a first session, the method comprising the steps of:
    establishing the first session on a first node of the multi-node system;
    after establishing the first session, registering a plurality of components for the first session;
    wherein each component of the plurality of components accesses a respective portion of the first session state;
    for each component registered:
        invoking a first routine of said each component to capture the component's respective portion of the first session state; and
        invoking a second routine of said each component to load the component's respective portion of the first session state into session state of a second session.

2. The method of claim 1, wherein the step of registering includes supplying a handle to call one or more routines for each component of said plurality of components.

3. The method of claim 1, wherein:
    each component of said plurality of components includes an interface that conforms to an interface definition and that includes one or more routines; and
    the step of invoking a first routine includes invoking a routine of said interface.

4. The method of claim 1, wherein the step of invoking a second routine includes invoking a routine of a corresponding version of each component on a second node to load said component's respective portion of the first session state into a session state of a session on the second node.

5. The method of claim 1, the steps further including, for each component of said plurality of components, invoking a routine of said each component that returns data that is used to determine whether said first session satisfies one or more criteria for migrating said first session.

6. The method of claim 1, wherein the steps further include, for at least one component of said plurality of components, invoking a routine of said at least one component that returns data that indicates a cost for transferring the respective portion of the first session state.

7. The method of claim 1, wherein the steps further include:
    determining that a first component of said plurality of components does not support migration of sessions; and
    foregoing migrating a third session from said first node in response to determining that the first component of said plurality of components does not support migration of sessions.

8. The method of claim 1, wherein the first session is hosted by a database server.

9. The method of claim 1, wherein at least one component of said plurality of components is adapted to perform one or more of the following:
    support execution of PL/SQL,
    support execution of Java, and
    manage a cursor.

10. A computer-readable medium storing one or more sequences of instructions for capturing and restoring a first session state of a first session, wherein execution of the one or more sequences of instructions by one or more processors causes the one or more processors to perform the steps of:
    establishing the first session on a first node of the multi-node system;
    after establishing the first session, registering a plurality of components for the
        first session;
    wherein each component of the plurality of components accesses a respective
        portion of the first session state;
    for each component registered:
    invoking a first routine of said each component to capture the component's
        respective portion of the first session state; and
    invoking a second routine of said each component to load the component's
        respective portion of the first session state into session state of a
        second session.

11. The computer-readable storage medium of claim 10, wherein the step of registering includes supplying a handle to call one or more routines for each component of said plurality of components.

12. The computer-readable storage medium of claim 10, wherein: each component of said plurality of components includes an interface that
- conforms to an interface definition and that includes one or more routines;
- and the step of invoking a first routine includes invoking a routine of said interface.

13. The computer-readable storage medium of claim 10, wherein the step of invoking a second routine includes invoking a routine of a corresponding version of each component on a second node to load said component's respective portion of the first session state into a session state of a session on the second node.

14. The computer-readable storage medium of claim 10, the steps further including, for each component of said plurality of components, invoking a routine of said each component that returns data that is used to determine whether said first session satisfies one or more criteria for migrating said first session.

15. The computer-readable storage medium of claim 10, wherein the steps further include, for at least one component of said plurality of components, invoking a routine of said at least one component that returns data that indicates a cost for transferring the respective portion of the first session state.

16. The computer-readable storage medium of claim 10, wherein the steps further include:
- determining that a first component of said plurality of components does not support migration of sessions; and
- foregoing migrating a third session from said first node in response to determining that the first component of said plurality of components does not support migration of sessions.

17. The computer-readable storage medium of claim 10, wherein the first session is hosted by a database server.

18. The computer-readable storage medium of claim 10, wherein at least one component of said plurality of components is adapted to perform one or more of the following:
- support execution of PL/SQL,
- support execution of Java, and
- manage a cursor.

* * * * *

UNITED STATES PATENT AND TRADEMARK OFFICE
CERTIFICATE OF CORRECTION

PATENT NO. : 7,415,522 B2  Page 1 of 1
APPLICATION NO. : 10/917843
DATED : August 19, 2009
INVENTOR(S) : Kaluskar et al.

It is certified that error appears in the above-identified patent and that said Letters Patent is hereby corrected as shown below:

Title page
On page 2, in column 2, under "Other Publications", line 5, delete "in" and insert -- on --, therefor.

On page 2, in column 2, under "Other Publications", line 26, delete "Dec. 12003," and insert -- Dec. 1, 2003, --, therefor.

On sheet 1 of 9, in Figure 1, at the bottom, line 1, delete "MUTLI" and insert -- MULTI --, therefor.

In column 4, line 29, after "system" insert -- . --.

In column 13, line 61, delete "SRC-NORMAL," and insert -- SRV- NORMAL --, therefor.

In column 13, line 67, delete "SRC-SELECTED," and insert -- SRV-SELECTED --, therefor.

In column 14, line 2, delete "SRC- CONFIRMED-SELECTED," and insert
-- SRV- CONFIRMED-SELECTED --, therefor.

In column 14, line 6, delete "SRC-READY-FOR-PREPARE," and insert
-- SRV-READY-FOR-PREPARE --, therefor.

In column 14, line 12, delete "SRC-PREPARE," and insert -- SRV-PREPARE --, therefor.

In column 14, line 13, delete "SRC-PREPARE," and insert -- SRV-PREPARE --, therefor.

In column 14, line 19, delete "SRC-READY-FOR-SWITCH," and insert
-- SRV-READY-FOR-SWITCH --, therefor.

In column 14, line 24, delete "SRC-SWITCHED," and insert -- SRV-SWITCHED --, therefor.

In column 14, line 27, delete "SRC-SWITCHED," and insert -- SRV-SWITCHED --, therefor.

In column 14, lines 59-60, delete "SRC-FAILURE," and insert -- SRV-FAILURE --, therefor.

Signed and Sealed this

Twentieth Day of April, 2010

David J. Kappos
*Director of the United States Patent and Trademark Office*